United States Patent
Sueishi

(10) Patent No.: US 10,059,152 B2
(45) Date of Patent: Aug. 28, 2018

(54) MOTORCYCLE TIRE FOR TRAVELING ON ROUGH TERRAIN

(71) Applicant: SUMITOMO RUBBER INDUSTRIES, LTD., Kobe-shi, Hyogo (JP)

(72) Inventor: Makoto Sueishi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/025,141

(22) PCT Filed: Oct. 2, 2014

(86) PCT No.: PCT/JP2014/076394
§ 371 (c)(1),
(2) Date: Mar. 25, 2016

(87) PCT Pub. No.: WO2015/056574
PCT Pub. Date: Apr. 23, 2015

(65) Prior Publication Data
US 2016/0236516 A1  Aug. 18, 2016

(30) Foreign Application Priority Data
Oct. 16, 2013  (JP) ................... 2013-215681

(51) Int. Cl.
*B60C 11/03* (2006.01)
*B60C 11/13* (2006.01)
(Continued)

(52) U.S. Cl.
CPC ...... *B60C 11/0316* (2013.01); *B29D 30/0601* (2013.01); *B60C 11/11* (2013.01);
(Continued)

(58) Field of Classification Search
CPC ..... B60C 11/0316; B60C 11/11; B60C 11/13; B60C 11/1315; B60C 2200/10; B60C 2200/14; B29D 30/0601
(Continued)

(56) References Cited

FOREIGN PATENT DOCUMENTS

| | | |
|---|---|---|
| CN | 1955021 A | 5/2007 |
| JP | 58-45103 | 3/1983 |

(Continued)

OTHER PUBLICATIONS

Shigeki, JP2005199927—Machine Translation.*
(Continued)

*Primary Examiner* — Alison L Hindenlang
*Assistant Examiner* — Yunju Kim
(74) *Attorney, Agent, or Firm* — Birch, Stewart, Kolasch & Birch, LLP

(57) ABSTRACT

Provided is a motorcycle tire (1) for traveling on rough terrain, the tire having a block (10) provided to a tread section (2). The block (10) has the following: a block lateral surface body part (15) that extends straight from the edge of a tread surface (12) inward in the tire radial direction; and a skirt section (20) that connects the block lateral surface body part (15) and a groove bottom surface (9). The skirt section (20) has the following: a flat section (21) that extends in a straight line on the groove bottom surface (9) side; and a curved section (22) that connects, in a beveled arc, the area between the flat section (21) and the block lateral surface body part.

5 Claims, 7 Drawing Sheets

(51) Int. Cl.
    *B29D 30/06*     (2006.01)
    *B60C 11/11*     (2006.01)

(52) U.S. Cl.
    CPC .......... *B60C 11/13* (2013.01); *B60C 11/1315* (2013.01); *B60C 2200/10* (2013.01); *B60C 2200/14* (2013.01)

(58) Field of Classification Search
    USPC .................................................. 152/209.12
    See application file for complete search history.

(56) References Cited

FOREIGN PATENT DOCUMENTS

| | | |
|---|---|---|
| JP | 2004-351956 A | 12/2004 |
| JP | 2005-199927 A | 7/2005 |
| JP | 2005-289092 A | 10/2005 |
| TW | 200524760 A | 8/2005 |

OTHER PUBLICATIONS

Sadahiko, JP2005289092A—Machine Translation.*
Extended European Search Report dated Apr. 7, 2017 for Application No. 14853854.9.
International Search Report for PCT/JP2014/076394 dated Dec. 22, 2014.
Written Opinion of the International Searching Authority for PCT/JP2014/076394 (PCT/ISA/237) dated Dec. 22, 2014.

* cited by examiner

MOTORCYCLE TIRE FOR TRAVELING ON ROUGH TERRAIN

TECHNICAL FIELD

The present invention relates to a motorcycle tire for running on rough terrain capable of improving durability of blocks.

BACKGROUND ART

For instance, motorcycle tires for running on rough terrain for using motocross or the like include a tread portion provided with a plurality of blocks. When these tires travel on off-road such as sandy, soil or muddy road, the blocks can bite the road to maintain grip performance.

In general, the blocks are molded using a recess of a mold through a vulcanization process. In the vulcanization process, tread rubber around blocks flows significantly. Such a significant rubber flow may cause a problem that a tread rubber thickness tends to be thin locally around the blocks and deteriorates durability of the blocks.

Furthermore, when traveling, a large stress and bending moment acts on the base portion of the respective blocks. Thus, there was a problem that damage tends to concentrate the base portion of the blocks.

In order to improve durability of tread blocks, the following patent document 1, for instance, has proposed a motorcycle tire for running on rough terrain having an improved shape of a base portion of a block.

CITATION LIST

Patent Literature

Patent document 1: Japanese Unexamined Patent Application Publication No. 2004-351956

SUMMARY OF INVENTION

Technical Problem

Unfortunately, there has been room for further improvement of durability of blocks even on the motorcycle for running on rough terrain tire in accordance with the above mentioned patent document 1.

The present invention has been made in view of circumstances described above, and has a main object to provide a motorcycle tire for running on rough terrain capable of improving durability of blocks.

Solution to Problem

The present invention provide a motorcycle tire for running on rough terrain including a tread portion provided with a plurality of blocks protruding from a virtual block bottom which extends along a groove bottom, in a block cross section passing a center of gravity of a ground contact surface of the blocks and being perpendicular to the virtual block bottom, the blocks including a block-sidewall main portion extending radially inwardly in a straight shape from an edge of the ground contact surface and a skirt portion that connects the block-sidewall main portion to the groove bottom, and the skirt portion including a planar portion extending in a straight shape on the side of the groove bottom and a curved portion so as to connect the block-sidewall main portion to the planar portion in a chamfered manner.

In the motorcycle tire for running on rough terrain according to the present invention, a skirt length (L1) measured along the virtual groove bottom from an intersection (P1) between the virtual block bottom and a virtual extension of the block-sidewall main portion to an intersection (P2) between the groove bottom and the skirt portion is preferably in a range of from 0.19 to 1.00 times a block height (Hb) from the virtual block bottom to the ground contact surface.

In the motorcycle tire for running on rough terrain according to the present invention, a skirt height (Hs) from the virtual block bottom to an intersection (P3) between a virtual extension of the planar portion and a virtual extension of the block-sidewall main portion is preferably in a range of from 0.02 to 0.13 times a block height (Hb) from the virtual block bottom to the ground contact surface.

In the motorcycle tire for running on rough terrain according to the present invention, a length of the planar portion along the virtual block bottom is preferably greater than a length of the curved portion along the virtual block bottom.

In the motorcycle tire for running on rough terrain according to the present invention, the planar portion is preferably inclined at an angle of from 5 to 15 degrees with respect to the virtual block bottom.

In the motorcycle tire for running on rough terrain according to the present invention, the planar portion preferably has an angle of less than 5 degrees with respect to the virtual block bottom.

Advantageous Effects of Invention

The motorcycle tire for running on rough terrain in accordance with the present invention includes the tread portion provided with a plurality of blocks protruding from the virtual block bottom which extends along the groove bottom. In a block cross section passing the center of gravity of the ground contact surface of the blocks and being perpendicular to the virtual block bottom, the blocks include the block-sidewall main portion extending radially inwardly in a straight shape from the edge of the ground contact surface and the skirt portion that connects the block-sidewall main portion to the groove bottom. Furthermore, the skirt portion includes the planar portion extending in a straight shape on the side of the groove bottom and the curved portion so as to connect the block-sidewall main portion to the planar portion in a chamfered manner.

The blocks having the skirt portion may effectively suppress crack locally generated on the base portion of the blocks by bending the curved portion and the planar portion when traveling on rough terrain.

Since the blocks in accordance with the present invention include the skirt portion, the virtual block bottom is greater than the conventional one. Accordingly, a recess of a vulcanization mold for molding each block has an opening greater than the conventional one. Thus, when each block is molded through the vulcanization process, rubber gathered from a wide area flows into the recess. Therefore, the blocks in accordance with the present invention may suppress a significant local rubber flow, and then may prevent the problem that a tread rubber thickness around the blocks tends to be thin locally.

As described above, the motorcycle tire for running on rough terrain in accordance with the present invention may improve durability of blocks.

DESCRIPTION OF EMBODIMENTS

Figure 1:
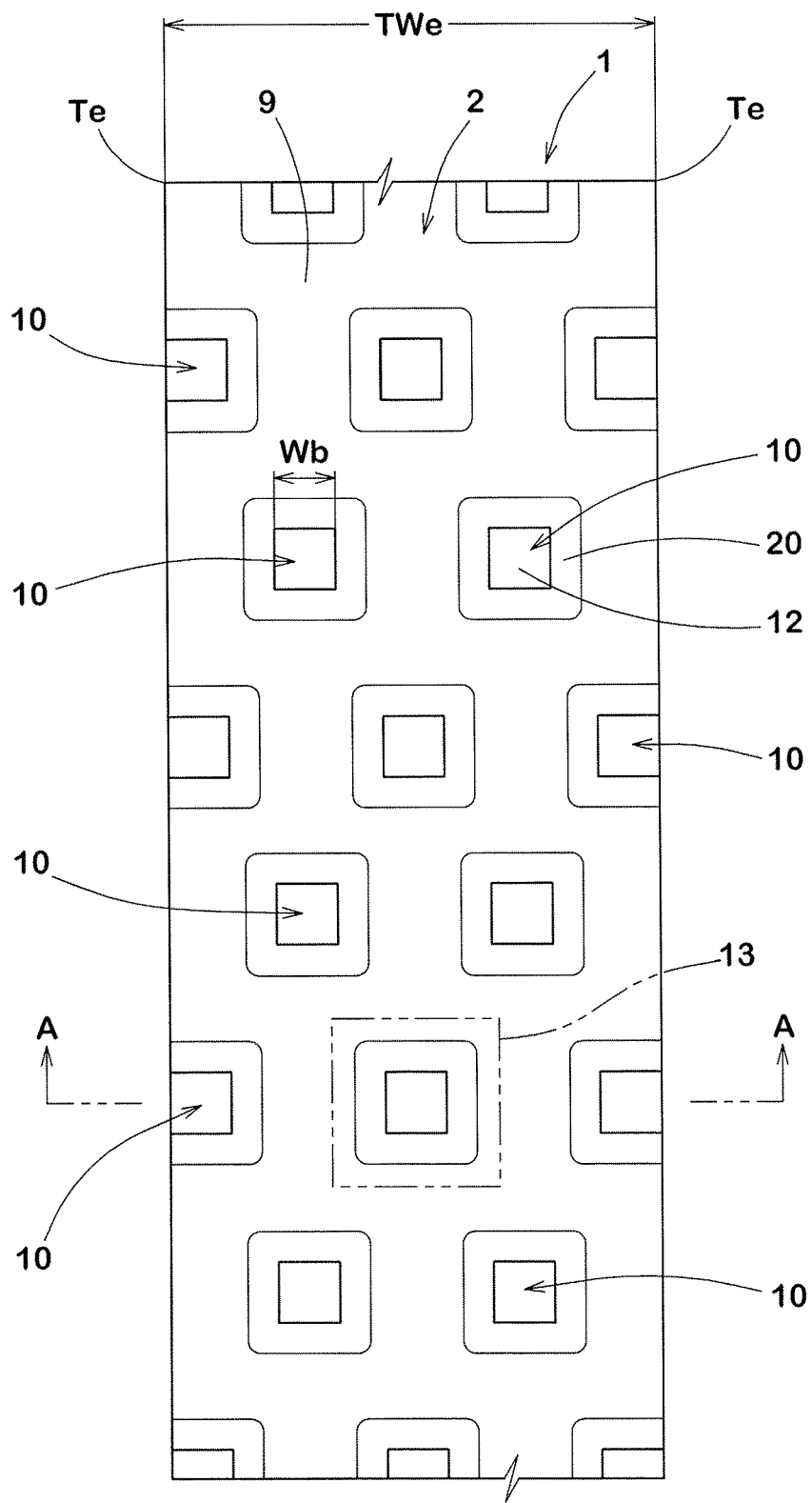
FIG. 1 is a development view of a tread portion of a pneumatic tire in accordance with an embodiment of the invention.

An embodiment of the present invention will be explained below with reference to the accompanying drawings. FIG. 1 illustrates a tread portion 2 of a motorcycle tire for running on rough terrain (hereinafter, simply referred to as "tire") 1 in accordance with an embodiment of the present invention. The tire 1 according to the embodiment, for instance, is illustrated as a tire for motocross race.

Figure 2:
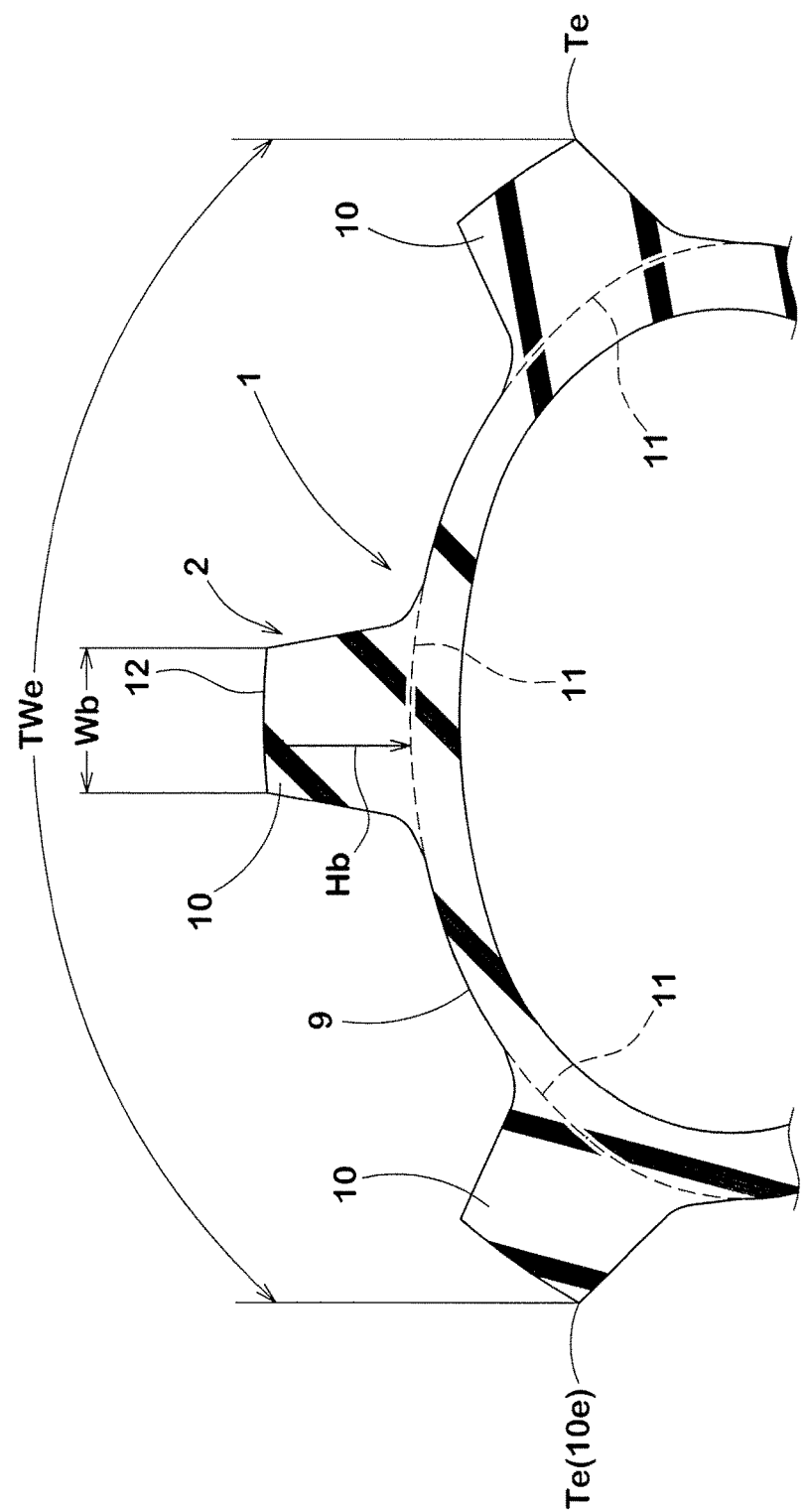
FIG. 2 is a cross-sectional view taken along lines A-A of FIG. 1.

FIG. 2 illustrates a cross-sectional view taken along lines A-A of the tread portion of FIG. 1. FIG. 2 is a cross-sectional view of the tire 1 under a standard state. The standard state is such that the tire is mounted on a standard wheel rim (not shown) with a standard pressure, but is loaded with no tire load. In this description, unless otherwise noted, dimensions of respective portions of the tire are values specified in the standard state.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 2, the tread portion 2 includes an outer surface that is curved so as to protrude radially outwardly.

The tread portion 2 is provided with a plurality of blocks 10. Each of the blocks 10 protrudes from a virtual block bottom 11 which extends along a groove bottom 9 forming a part of the outer surface of the tread portion 2. For traveling on rough terrain, the block height Hb from the virtual block bottom 11 to a ground contact surface 12 of the block 10, for example, is in a range of from 6 to 22 mm. The axial width Wb of the ground contact surface 12 of the block 10, for example, is in a range of from 5% to 15% of a tread development width TWe. Note that the block height Hb and the width Wb of the block 10 are not limited to these ranges.

The tread development width TWe is a length in a width direction of the tire portion between tread edges Te and Te measured along the outer surface of the tread portion 2. Each tread edge Te means an axially outer edge 10e of the block 10 arranged axially outermost of the tread portion 2.

As illustrated in FIG. 1, the ground contact surface 12 of the block 10 has a substantially square shape. Alternatively, any shapes may be employed for the shape of the ground contact surface 12 of the block 10. For instance, a polygonal shape, a circular shape, an oval shape and the like may be used as the ground contact surface 12 of the block 10.

Figure 3:
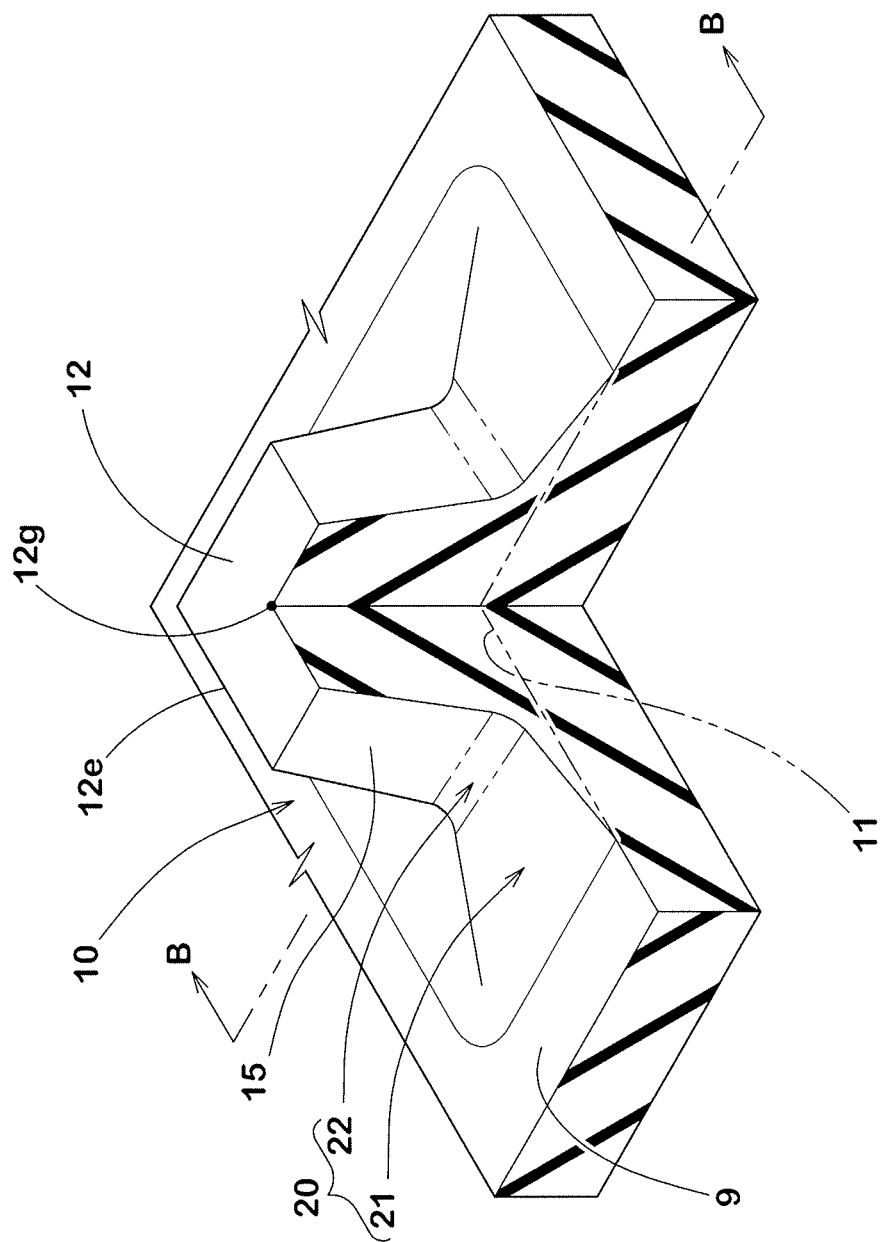
FIG. 3 is an enlarged perspective view of a block illustrated in FIG. 1.

FIG. 3 illustrates an enlarged perspective view of the block 10. FIG. 3 is an enlarged perspective view of a region 13 surrounded by two-dot chain line shown in FIG. 1. As illustrated in FIG. 3, the block 10 includes a block-sidewall main portion 15 and a skirt portion 20. In order to help understanding, a boundary between the block-sidewall main portion 15 and the skirt portion 20 is indicated using two-dot chain line in FIG. 3.

Figure 4:
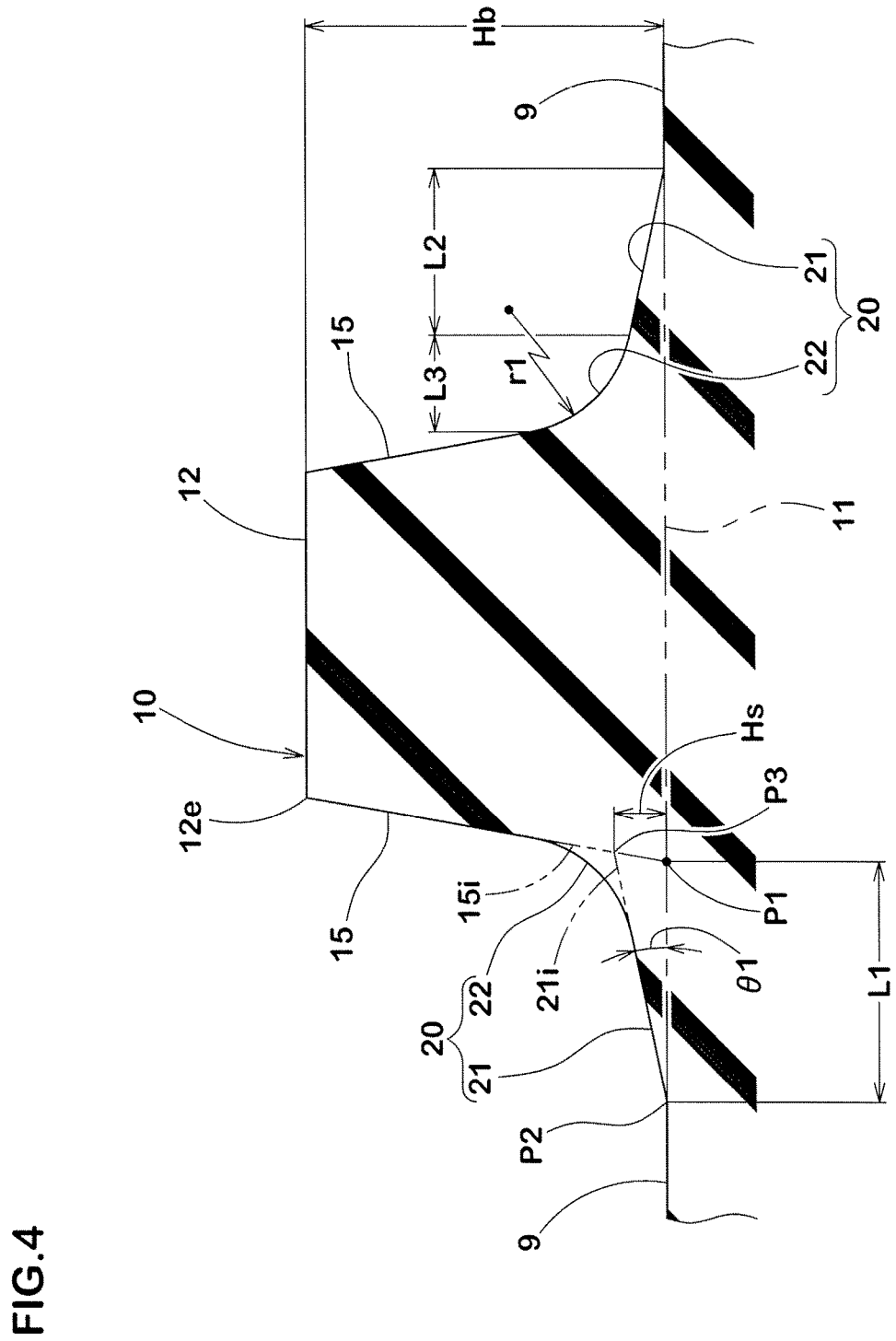
FIG. 4 is a cross-sectional view taken along lines B-B of the block illustrated in FIG. 3.

FIG. 4 illustrates a cross-sectional view taken along lines B-B of the block 10 illustrated in FIG. 3. This B-B cross section is a section that passes the center 12g (shown in FIG. 3) of gravity of the ground contact surface 12 of the block 10, and is perpendicular to the virtual block bottom 11 and an edge 12e of the ground contact surface 12. Although the following description relates to the B-B cross section, the same applies with respect to the section that is perpendicular to the B-B cross section shown in FIG. 3.

As illustrated in FIG. 4, the block-sidewall main portion 15 extends axially inwardly in a straight shape from the edge 12e of the ground contact surface 12. The skirt portion 20 connects between the block-sidewall main portion 15 and the groove bottom 9.

The skirt portion 20 includes a planar portion 21 and a curved portion 22. In FIG. 3, to help understanding, a boundary between the planar portion 21 and the curved portion 22 is indicated using two-dot chain line. As illustrated in FIG. 4, the planar portion 21 extends in a straight manner on the side of the groove bottom 9. The curved portion 22 is formed as an arc shape (like a fillet) so as to chamfer the corner between the planar portion 21 and the block-sidewall main portion 15.

Such a block 10 having the skirt portion 20 may effectively suppress crack locally generated on the base portion of the block 10 by bending the curved portion 22 and the planar portion 21 as a whole, when traveling on rough terrain. Accordingly, damage of the block 10 may be effectively prevented to improve durability of the block 10.

Figure 5A:
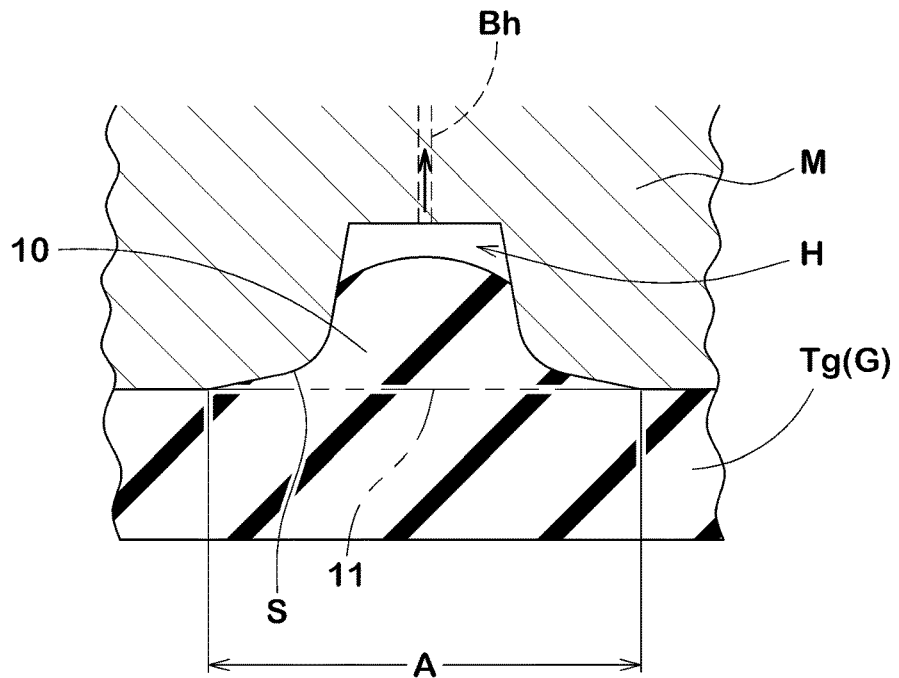
FIG. 5A is a cross-sectional view of the block during vulcanization process.
Figure 5B:
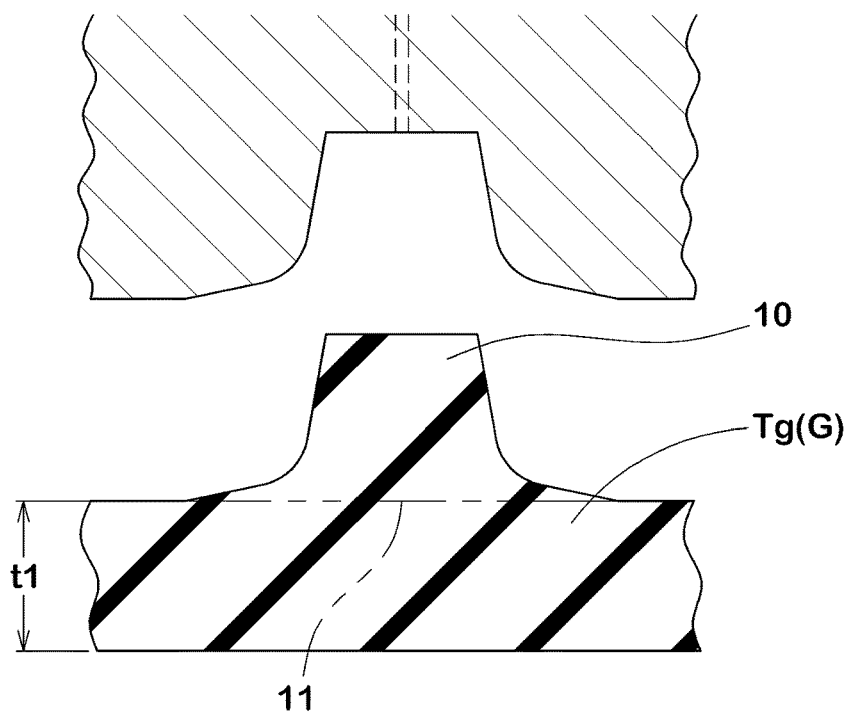
FIG. 5B is a cross-sectional view of the block after vulcanization process.

FIG. 5 illustrate cross-sectional views of the block 10 in accordance with the present embodiment formed through a vulcanization process. FIG. 5A is the cross-sectional view when a tread rubber Tg of a green tire is flowing into a recess H of a vulcanization mold M. The recess H is decompressed by discharging the air through a vent hole Bh of the vulcanization mold M. FIG. 5B is a cross-sectional view of the block 10 removed from the mold after the vulcanization process. Note that a carcass ply and a tread reinforcing layer, which are disposed in the tread rubber Tg of the green tire, are not illustrated in FIGS. 5A and 5B.

As illustrated in FIG. 5A, the recess H has a revere shape of the block 10. Thus, the width A of the opening for forming the virtual block bottom 11 is greater than the conventional opening width A. When the block 10 is molded during the vulcanization process, rubber G gathered from a wide area flows into the recess H. Furthermore, the rubber G may flows into the recess H smoothly along an outer surface S of the recess H.

Therefore, a significant local rubber flow may be prevented, and then the block 10 in accordance with the invention may effectively prevent that the thickness t1 of the tread rubber Tg at around the base portion of the block 10 tends to be thin locally, as shown in FIG. 5B. Accordingly, the thickness of the tread rubber Tg tends to be uniform, thereby improving durability of the block 10.

In order to further improve the effects, as shown in FIG. 4, the skirt portion 20 preferably has a skirt length L1 in a range of not less than 0.19 times, more preferably not less than 0.38 times, still further preferably not less than 0.50 times, but preferably not more than 1.00 times, more preferably not more than 0.75 times, still further preferably not more than 0.63 times the block height Hb. Such a skirt portion 20 may offer a smooth flow of the rubber G into the recess H to have an uniform thickness of the tread rubber Tg while ensuring a sufficient biting amount of the block 10 into a muddy road. The skirt length L1 is a length measured along the virtual groove bottom 11 from an intersection P1 between the virtual block bottom 11 and a virtual extension 15i of the block-sidewall main portion 15 to an intersection P2 between the groove bottom 9 and the skirt portion 20.

In the same point of view, the skirt height Hs of the skirt portion 20 is preferably in a range of not less than 0.02 times, more preferably not less than 0.05 times, but preferably not more than 0.13 times, but preferably not more than 0.08 times the block height Hb. The skirt height Hs is a height from the virtual block bottom 11 to an intersection P3 between a virtual extension 21i of the planar portion 21 and the virtual extension 15i of the block-sidewall main portion 15.

The angle θ1 of the planar portion 21 with respect to the virtual block bottom 11 is preferably in a range of not less than 5 degrees, more preferably not less than 8 degrees, but preferably not more than 15 degrees, more preferably not more than 12 degrees. Such a planar portion 21 may improve durability of the block 10 while ensuring a sufficient biting amount of the block 10 into a muddy road.

Preferably, the length L2 of the planar portion 21 along the virtual block bottom 11 is greater than the length L3 of the curved portion 22 along the virtual block bottom 11. Such a planar portion 21 may offer a smooth flow of rubber G during vulcanization process. The ratio L3/L2 of the length L3 of the curved portion 22 to the length L2 of the planar portion 21 is preferably in a range of not less than 0.25, more preferably not less than 0.30, but preferably not more than 0.45, more preferably not more than 0.40. If the ratio L3/L2 is less than 0.25, flow resistance of rubber G into the recess during vulcanization tends to increase. On the other hand, if the ratio L3/L2 is more than 0.45, grip performance tends to deteriorate due to lowering of biting amount of the block 10 into muddy road.

The radius of curvature r1 of the curved portion 22 is preferably in a range of not less than 0.25 times, more preferably not less than 0.30 times, but preferably not more than 0.45 times, but preferably not more than 0.40 times the block height Hb. Such a curved portion 22 may reduce flow resistance of rubber G into the recess while ensuring a sufficient biting amount of the block into muddy road.

As for a motocross tire, the land ratio Lr is preferably in a range of not less than 5%, more preferably not less than 15%, but preferably not more than 35%, more preferably not more than 25%. When the land ratio Lr is less than 5%, bending moment as well as shearing force acting on one block 10 tends to be high, and there is a possibility to be generated a crack on the base portion of the block 10. On the other hand, when the land ratio is more than 35%, grip performance tends to deteriorate due to lowering of biting amount of the block 10 into muddy road. As used herein, the land ratio Lr is a ratio Sb/St of a total area Sb of the ground-contact surfaces 12 of the blocks 10 to the total area St of the outer surface of the tread portion when the all grooves are perfectly filled up virtually.

Figure 6:
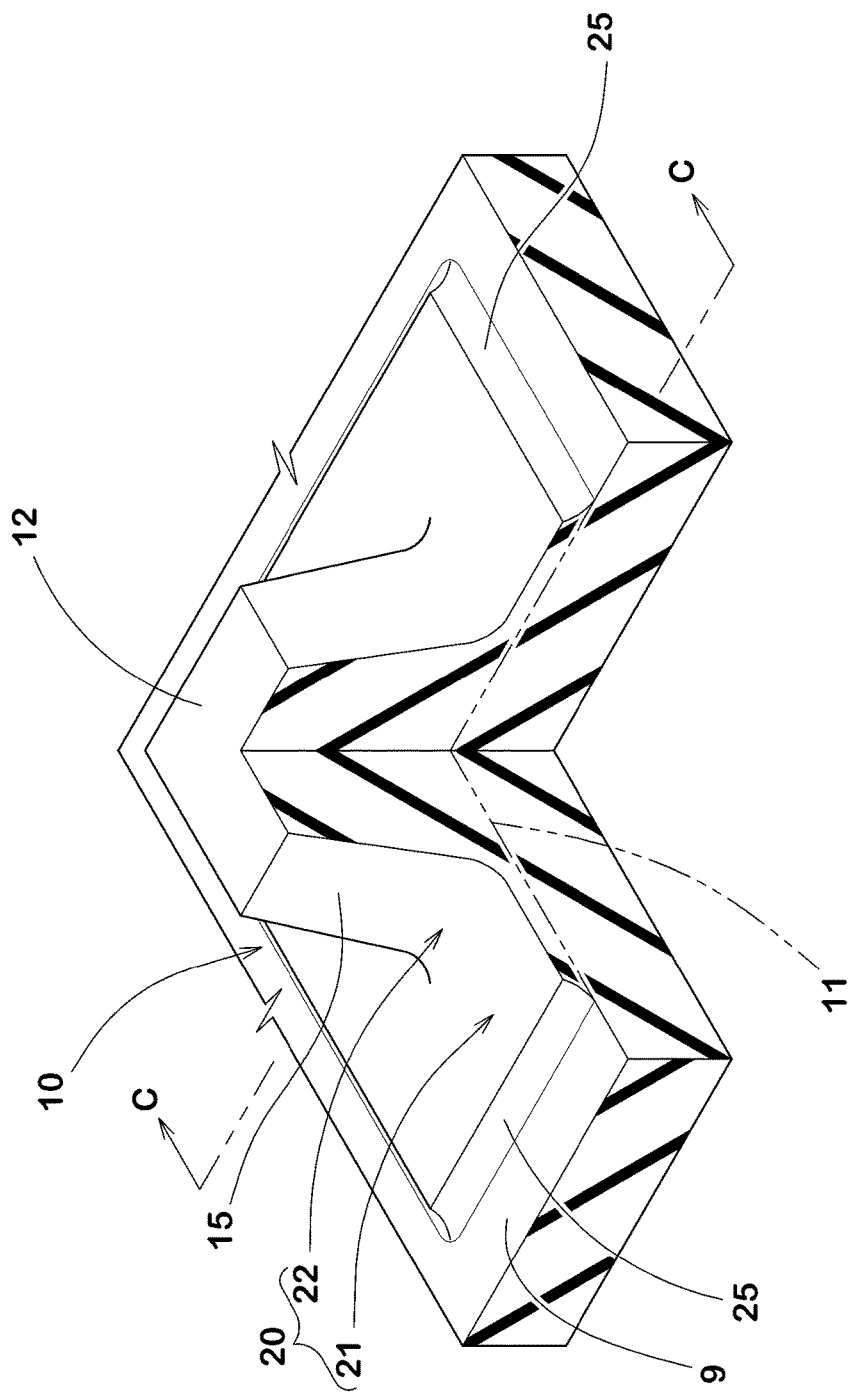
FIG. 6 is a cross-sectional view of the block in accordance with another embodiment.

FIG. 6 is a cross-sectional view of the block 10 in accordance with another embodiment. The block 10 illustrated in FIG. 6 includes the planar portion 21 extending at an angle of less than 5 degrees with respect to the virtual block bottom 11, and a step portion 25 connecting between the planar portion 21 and the groove bottom 9. Such a block 10 may offer a sufficient rubber volume at the skirt portion 20 due to the planar portion 21. Thus, crack locally generated on the base portion of the block 10 may effectively be prevented.

Figure 7:
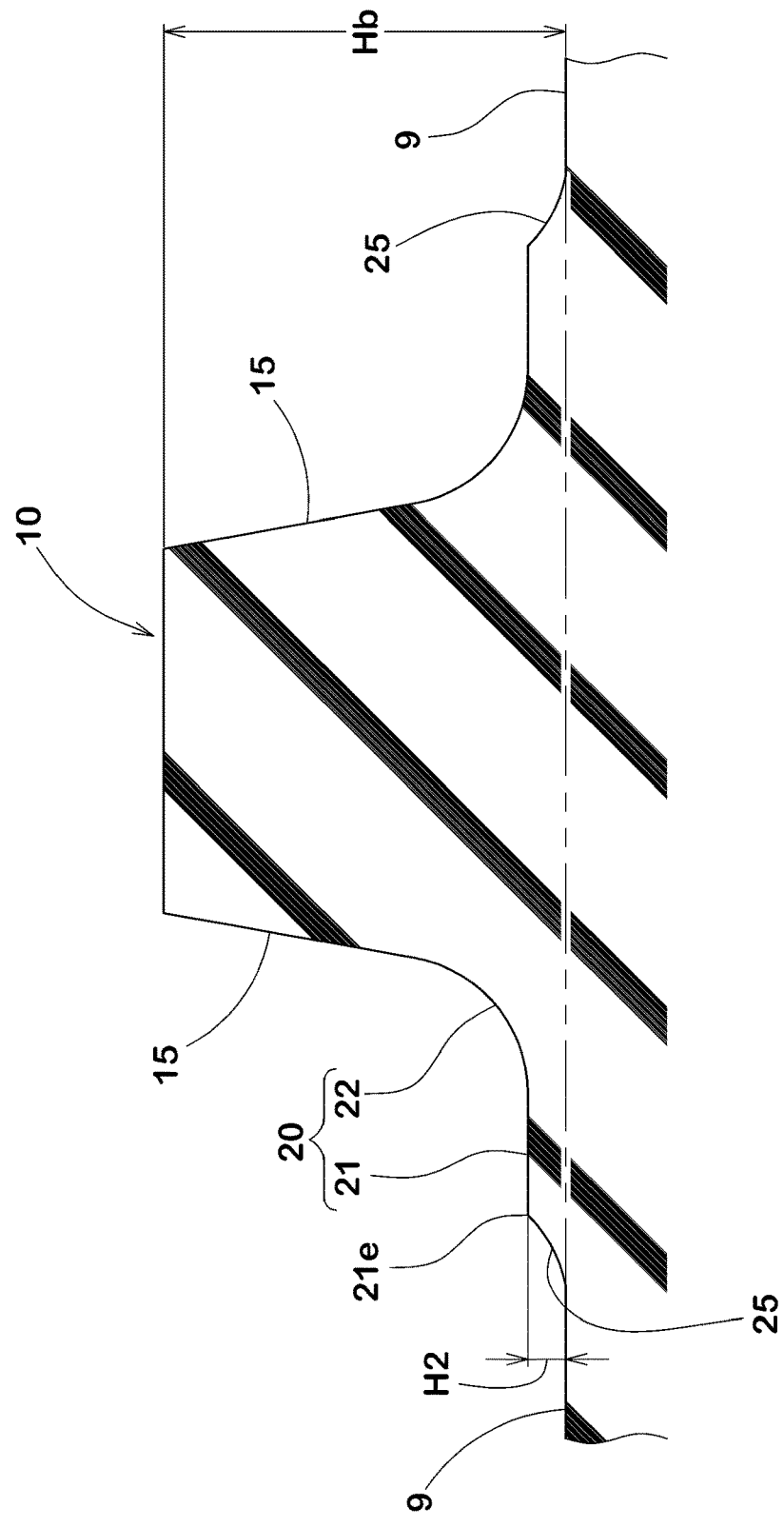
FIG. 7 is a cross-sectional view taken along lines C-C of FIG. 6.

FIG. 7 illustrates a cross-sectional view of the block 10 taken along lines C-C of FIG. 6. As illustrates in FIG. 7, the thickness H2 of the planar portion 21 according to the embodiment is preferably in a range of from not less than 0.05 times, more preferably not less than 0.08 times, but preferably in a range of not more than 0.15 times, more preferably not more than 0.12 times the block height Hb. The planar portion 21 may effectively improve durability of the block 10 by offering an uniform thickness of the groove bottom.

The step portion 25 is formed as an arc shape to connect between the groove bottom 9 to the planar portion 21 in a chamfered manner. The step portion 25 can effectively suppress the damage at the outer edge 21e of the planar portion 21.

While the embodiments in accordance with the present invention have been described in detail, the present invention is not limited to the illustrated embodiments, but can be modified and carried out in various aspects.

Example

Tires having a basic tread pattern illustrated in FIG. 1 and a block shape illustrated in FIG. 3 or FIG. 6 were manufactured based on details shown in Table 1. For the comparative example, a tire having the basic tread pattern illustrated in FIG. 1 and a block without having the skirt portion was manufactured. These tires were mounted on the following rim with the inner pressure, and then were tested with respect to block durability and thickness uniformity of the tread rubber. The common specifications of tires and test procedures are as follows.

Tire size: 120/80-19
Rim size: 2.15×19
Internal pressure: 80 kPa
Block Durability:

Each test tire was made to run on a drum having an outer diameter of 1.7 m with a vertical load of 1.95 kN at a speed of 50 km/h. Then, the traveling distance was measured until a block chipping happens. The results are indicated using an index based on Ref. 1 being 100. The larger the value, the better the block durability maintain.

Thickness Uniformity of Tread Rubber:

The difference between a rubber thickness of the groove bottom where no block is provided and a rubber thickness at an outer edge of the skirt portion was measured. The results are indicated using an index based on Ref. 1 being 100. The smaller the value, the better the sufficient rubber volume around the skirt portion is.

The test results are shown in table 1.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Block shape | — | FIG. 3 | FIG. 3 | FIG. 3 | FIG. 3 | FIG. 3 | FIG. 3 | FIG. 3 | FIG. 3 | FIG. 3 |
| Block height Hb (mm) | 16.0 | 16.0 | 16.0 | 16.0 | 16.0 | 16.0 | 16.0 | 16.0 | 16.0 | 16.0 |
| Skirt length L1/Block height Hb | — | 0.63 | 0.63 | 0.63 | 0.63 | 0.19 | 0.25 | 0.38 | 0.50 | 0.75 |
| Skirt height Hs/Block height Hb | — | 0.06 | 0.03 | 0.13 | 0.19 | 0.06 | 0.06 | 0.06 | 0.06 | 0.06 |
| Curved portion length L3/Planar portion length L2 | — | 0.36 | 0.36 | 0.36 | 0.36 | 0.36 | 0.36 | 0.36 | 0.36 | 0.36 |
| Planar portion angle θ1 | — | 10.0 | 10.0 | 10.0 | 10.0 | 10.0 | 10.0 | 10.0 | 10.0 | 10.0 |
| Curved portion radius/Block height Hb | — | 0.35 | 0.35 | 0.35 | 0.35 | 0.35 | 0.35 | 0.35 | 0.35 | 0.35 |
| Block durability (Index) | 100 | 110 | 105 | 107 | 104 | 104 | 105 | 105 | 107 | 107 |
| Thickness uniformity of tread rubber (Index) | 100 | 70 | 85 | 79 | 95 | 92 | 73 | 70 | 70 | 76 |

|  | Ex. 10 | Ex. 11 | Ex. 12 | Ex. 13 | Ex. 14 | Ex. 15 | Ex. 16 | Ex. 17 | Ex. 18 | Ex. 19 |
| --- | --- | --- | --- | --- | --- | --- | --- | --- | --- | --- |
| Block shape | FIG. 3 | FIG. 3 | FIG. 3 | FIG. 3 | FIG. 3 | FIG. 3 | FIG. 3 | FIG. 3 | FIG. 3 | FIG. 6 |
| Block height Hb (mm) | 16.0 | 16.0 | 16.0 | 16.0 | 16.0 | 16.0 | 16.0 | 16.0 | 16.0 | 16.0 |
| Skirt length L1/Block height Hb | 100 | 0.63 | 0.63 | 0.63 | 0.63 | 0.63 | 0.63 | 0.63 | 0.63 | 0.63 |
| Skirt height Hs/Block height Hb | 0.06 | 0.06 | 0.06 | 0.06 | 0.06 | 0.06 | 0.06 | 0.06 | 0.06 | 0.06 |
| Curved portion length L3/Planar portion length L2 | 0.36 | 0.25 | 0.3 | 0.4 | 0.45 | 0.36 | 0.36 | 0.36 | 0.36 | 0.36 |
| Planar portion angle θ1 | 10 | 10 | 10 | 10 | 10 | 5 | 15 | 10 | 10 | 10 |
| Curved portion radius/Block height Hb | 0.35 | 0.35 | 0.35 | 0.35 | 0.35 | 0.35 | 0.35 | 0.25 | 0.45 | 0.35 |
| Block durability (Index) | 104 | 106 | 108 | 108 | 105 | 105 | 107 | 104 | 108 | 112 |
| Thickness uniformity of tread rubber (Index) | 85 | 83 | 76 | 73 | 84 | 75 | 87 | 80 | 77 | 73 |

From the test results, it was confirmed that the example tires has improved durability of blocks.

REFERENCE SIGNS LIST

2 Tread portion
9 Groove bottom
10 Block
11 Virtual block bottom
12 Ground contact surface
15 Block-sidewall main portion
20 Skirt portion
21 Planar portion
22 Curved portion

The invention claimed is:

1. A motorcycle tire for running on rough terrain comprising:
a tread portion provided with a plurality of blocks protruding from a virtual block bottom which extends along a groove bottom;
in a block cross section passing a center of gravity of a ground contact surface of the blocks and being perpendicular to the virtual block bottom, the blocks comprising a block-sidewall main portion extending radially inwardly in a straight shape from an edge of the ground contact surface and a skirt portion that connects the block-sidewall main portion to the groove bottom; and
the skirt portion comprising a planar portion extending in a straight shape on the side of the groove bottom and a curved portion so as to connect the block-sidewall main portion to the planar portion in a chamfered manner, wherein a skirt height (Hs) from the virtual block bottom to an intersection (P3) between a virtual extension of the planar portion and a virtual extension of the block-sidewall main portion is in a range of from 0.02 to 0.13 times a block height (Hb) from the virtual block bottom to the ground contact surface,
wherein a skirt length (L1) measured along the virtual block bottom from an intersection (P1) between the virtual block bottom and a virtual extension of the block-sidewall main portion to an intersection (P2) between the groove bottom and the skirt portion is in a range of from 0.19 to 1.00 times a block height (Hb) from the virtual block bottom to the ground contact surface.

2. The motorcycle tire for running on rough terrain according to claim 1, wherein a length of the planar portion along the virtual block bottom is greater than a length of the curved portion along the virtual block bottom.

3. The motorcycle tire for running on rough terrain according to claim 1, wherein the planar portion is inclined at an angle of from 5 to 15 degrees with respect to the virtual block bottom.

4. The motorcycle tire for running on rough terrain according to claim 1, wherein the planar portion has an angle of less than 5 degrees with respect to the virtual block bottom.

5. The motorcycle tire for running on rough terrain according to claim 1, wherein a radius of curvature (r1) of the curved portion is in a range of from 0.25 to 0.45 times the block height (Hb).

* * * * *